United States Patent
Li et al.

(10) Patent No.: US 9,992,725 B2
(45) Date of Patent: Jun. 5, 2018

(54) METHOD AND APPARATUS FOR IMPLEMENTING HIGH-FREQUENCY COMMUNICATION

(71) Applicant: HUAWEI TECHNOLOGIES CO., LTD., Shenzhen, Guangdong (CN)

(72) Inventors: Sainan Li, Chengdu (CN); Huang Huang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/355,846

(22) Filed: Nov. 18, 2016

(65) Prior Publication Data

US 2017/0070937 A1 Mar. 9, 2017

Related U.S. Application Data

(63) Continuation of application No. PCT/CN2015/094582, filed on Nov. 13, 2015.

(30) Foreign Application Priority Data

Dec. 15, 2014 (WO) ................ PCT/CN2014/093863

(51) Int. Cl.
*H04W 36/00* (2009.01)
*H04W 36/30* (2009.01)
*H04L 5/00* (2006.01)

(52) U.S. Cl.
CPC ........... *H04W 36/30* (2013.01); *H04L 5/0055* (2013.01); *H04W 36/0055* (2013.01)

(58) Field of Classification Search
CPC .. H04W 36/30; H04W 36/0055; H04L 5/0055
See application file for complete search history.

(56) References Cited

U.S. PATENT DOCUMENTS

| | | | | |
|---|---|---|---|---|
| 5,893,033 | A * | 4/1999 | Keskitalo | H04W 36/32 455/437 |
| 6,760,599 | B1 * | 7/2004 | Uhlik | H04B 7/022 455/436 |

(Continued)

FOREIGN PATENT DOCUMENTS

| | | |
|---|---|---|
| CN | 101399799 A | 4/2009 |
| CN | 102090021 A | 6/2011 |

(Continued)

*Primary Examiner* — Ajit Patel
(74) *Attorney, Agent, or Firm* — Huawei Technologies Co., Ltd.

(57) ABSTRACT

Embodiments of the present application relate to a method and apparatus for implementing high-frequency communication. The method includes: receiving, by a high-frequency base station, a scan request message sent by a base station originally connected to user equipment (UE); sending, by the high-frequency base station, a scan acknowledgment message to the base station originally connected to the UE; receiving, by the high-frequency base station, information about the UE sent by the base station originally connected to the UE; and scanning the UE, by the high-frequency base station, according to the information about the UE, so as to re-establish a high-frequency connection between the UE and the high-frequency base station.

17 Claims, 7 Drawing Sheets

(56) References Cited

U.S. PATENT DOCUMENTS

| | | | | |
|---|---|---|---|---|
| 2005/0250499 A1* | 11/2005 | Lee | ................ | H04W 36/0055 455/437 |
| 2009/0046632 A1* | 2/2009 | Nanda | ................ | H04W 48/02 370/328 |
| 2009/0097449 A1* | 4/2009 | Jin | ................ | H04W 36/0055 370/331 |
| 2009/0296659 A1 | 12/2009 | Lim et al. | | |
| 2010/0027507 A1 | 2/2010 | Li et al. | | |
| 2011/0077013 A1 | 3/2011 | Cho et al. | | |
| 2011/0149889 A1 | 6/2011 | Um et al. | | |
| 2012/0026977 A1* | 2/2012 | Kim | ................ | H04W 36/0094 370/331 |
| 2012/0108253 A1* | 5/2012 | Mao | ................ | H04W 48/20 455/450 |
| 2012/0320874 A1* | 12/2012 | Li | ................ | H04W 48/12 370/331 |
| 2013/0083774 A1* | 4/2013 | Son | ................ | H04W 36/0055 370/331 |
| 2013/0155847 A1 | 6/2013 | Li et al. | | |
| 2013/0294354 A1* | 11/2013 | Zhang | ................ | H04W 72/04 370/329 |
| 2013/0331136 A1* | 12/2013 | Yang | ................ | H04B 7/024 455/501 |
| 2014/0098912 A1* | 4/2014 | Yin | ................ | H04B 7/0417 375/345 |
| 2014/0105050 A1* | 4/2014 | Kang | ................ | H04W 36/30 370/252 |
| 2014/0225775 A1* | 8/2014 | Clevorn | ................ | H01Q 3/34 342/372 |
| 2015/0181485 A1 | 6/2015 | Son et al. | | |
| 2016/0192268 A1 | 6/2016 | Takeda et al. | | |
| 2017/0208524 A1 | 7/2017 | Fukui et al. | | |

FOREIGN PATENT DOCUMENTS

| | | |
|---|---|---|
| CN | 103442397 A | 12/2013 |
| JP | 2007536784 A | 12/2007 |
| JP | 2010028816 A | 2/2010 |
| JP | 2012533944 A | 12/2012 |
| JP | 2014531852 A | 11/2014 |
| KR | 20140113642 A | 9/2014 |
| WO | 2014097743 A1 | 6/2014 |
| WO | 2015194338 A1 | 12/2015 |
| WO | 2016003624 A1 | 1/2016 |

\* cited by examiner

METHOD AND APPARATUS FOR IMPLEMENTING HIGH-FREQUENCY COMMUNICATION

CROSS-REFERENCE TO RELATED APPLICATIONS

This application is a continuation of International Application No. PCT/CN2015/094582, filed on Nov. 13, 2015, which claims priority to International Application No. PCT/CN2014/093863, filed on Dec. 15, 2014. The disclosures of the aforementioned applications are hereby incorporated by reference in their entireties.

TECHNICAL FIELD

Embodiments of the present application relate to wireless communications technologies, and in particular, to a method and apparatus for implementing high-frequency communication.

BACKGROUND

With rapid development of communications technologies, in a communications network the requirements for system capacity, data throughput rate, transmission delay, and transmission reliability are increasingly high. However, bandwidth that a traditional microwave frequency band can provide is limited, which cannot meet ever-increasing requirements, and therefore mobile communication will inevitably develop into a millimeter wave band with a higher frequency band. Currently, advantages of millimeter wave (high frequency) communication are a large capacity and a high data throughput rate. However, because of the atmosphere, water mist/vapor, and obstructions, attenuation of the millimeter wave communication is high, and generally, coverage of a high-frequency base station is relatively small. In addition, in high-frequency networking communication, because a millimeter wave may be easily affected by environment interference, for example, a factor such as an architectural blockage, a human body blockage, or interference, a coverage hole appears at a specific probability in a coverage area of a high-frequency base station, wherein a signal received by user equipment (UE) is very weak and even cannot be effectively demodulated.

In the prior art, a multi-level beam switching mechanism is mainly introduced to resolve the foregoing technical problem, thereby ensuring reliability of high-frequency communication. Specifically, an operating principle of the multi-level beam switching mechanism is mainly as follows: In a case of high-low frequency hybrid networking, UE may receive many beams from a same base station or from different base stations, and after selecting a beam with best signal quality to access a link, the UE still periodically measures a signal of another beam that can be received, and prioritizes target beams satisfying a link that can be accessed, where priority orders may be as follows: (1) corresponding to a control channel as that of a currently accessed beam; (2) corresponding to a control channel different from that of the currently accessed beam, but connected to a same cell; (3) connected to a cell different from that of the currently accessed beam, but connected to a same cellular base station; (4) connected, in a wired manner, to a cellular base station different from that connected to the currently accessed beam; (5) connected, in a wireless manner, to a cellular base station different from that connected to the currently accessed beam. When communication quality of the accessed beam deteriorates and even communication is disconnected, the UE first attempts to recover the communication quality of the current beam, and if the communication quality cannot be recovered, switches to another target beam according to the foregoing priority orders to maintain communication continuity.

However, in the prior art, when UE enters a coverage hole because of blockage of an obstruction or other interference, a link is suddenly disconnected or deteriorates into a state in which normal demodulation cannot be performed, and in this case, there is no beam that can be switched, or when a beam that can be used for switching is blocked by an obstruction or is affected by other interference, signal quality deteriorates into a state in which normal receiving cannot be performed, high-frequency communication is disconnected, which still causes a problem of relatively low system reliability.

SUMMARY

A method for implementing high-frequency communication comprises sending, by an originally connected base station, a scan request message to at least one target to-be-accessed base station when user equipment (UE) served by the originally connected base station is in a coverage hole state, receiving acknowledgement scan information sent by the at least one target to-be-accessed base station, and sending information about the UE to the at least one target to-be-accessed base station, so that the at least one target to-be-accessed base station scans the UE according to the information about the UE, and establishes a high-frequency connection between the UE and one of the at least one target to-be-accessed base station.

A method for implementing high-frequency communication comprises receiving, by a high-frequency base station, a scan request message sent by a base station originally connected to user equipment (UE), sending, by the high-frequency base station, a scan acknowledgment message to the base station originally connected to the UE, receiving, by the high-frequency base station, information about the UE sent by the base station originally connected to the UE, scanning the UE, by the high-frequency base station, according to the information about the UE, and establishing a high-frequency connection between the UE and the high-frequency base station.

A high-frequency base station includes a transmitter configured to send a scan request message to at least one target to-be-accessed base station to which a beam that can cover a position of user equipment (UE) belongs, and a receiver configured to receive acknowledgement scan information sent by the at least one target to-be-accessed base station. The transmitter is further configured to send information about the UE to the at least one target to-be-accessed base, so that the at least one target to-be-accessed base station scans the UE according to the information about the UE, and establish a high-frequency connection between the UE and one base station of the at least one of target to-be-accessed base station.

A high-frequency base station includes a receiver configured to receive a scan request message sent by a base station originally connected to user equipment (UE), and a transmitter configured to send a scan acknowledgment message to the base station originally connected to the UE, wherein the receiver is further configured to receive information about the UE sent by the base station originally connected to the UE, and a processor coupled to the receiver and the transmitter and configured to scan the UE according to the information about the UE, establishing a high-frequency connection between the UE and the high-frequency base station.

BRIEF DESCRIPTION OF DRAWINGS

To describe the technical solutions in the embodiments of the present application more clearly, the following briefly describes the accompanying drawings required for describing the embodiments or the prior art. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The described embodiments are merely some but not all of the embodiments of the present application. All other embodiments obtained by a person of ordinary skill in the art based on the embodiments of the present application without creative efforts shall fall within the protection scope of the present application.

Figure 1:
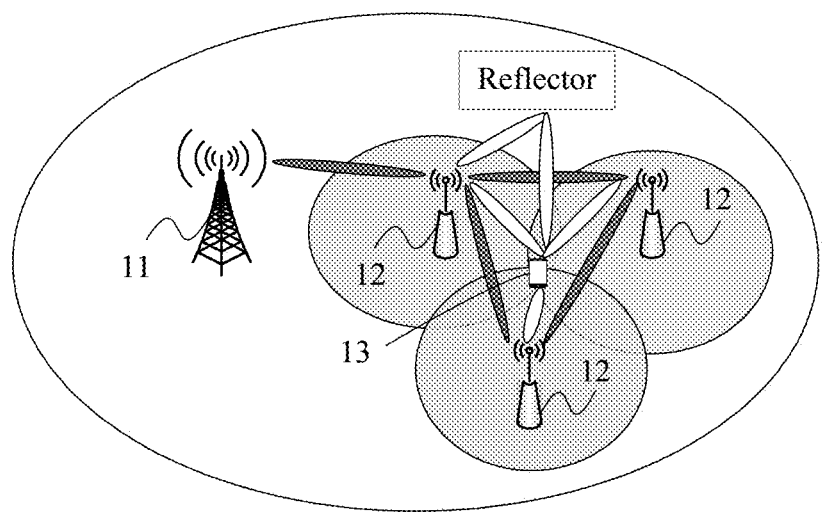
FIG. 1 is a diagram of a first application scenario of a method for implementing high-frequency communication in a coverage hole (that is, a high-low frequency macro/micro networking architecture) according to the present application.

FIG. 1 is a diagram of a first application scenario of a method for implementing high-frequency communication in a coverage hole (that is, a high-low frequency macro/micro networking architecture) according to the present application. In this scenario, an example in which a macro base station and a small cell are used as base stations is used for description. As shown in FIG. 1, in the high-low frequency macro/micro networking architecture, a macro base station 11, a micro base station 12, and UE 13 are mainly included. The macro base station 11 generally uses a traditional cellular frequency band, for example, the cellular frequency band may be 2 GHz, or may use a millimeter wave frequency band with a relatively low frequency to achieve an objective of control-plane interaction with a relatively large area, where the millimeter wave frequency band with a relatively low frequency may be, for example, 3.5 GHz. The macro base station 11 may perform corresponding signaling interaction with the small cell 12 or the UE 13 by using the foregoing cellular frequency band or the millimeter wave frequency band. In addition, multiple small cells 12 may be arranged in coverage of the macro base station 11 to provide hotspot coverage. The small cell 12 uses a millimeter wave frequency band with a relatively high frequency, for example, the millimeter wave frequency band may be 28 GHz, 38 GHz, or an E-Band, to cover a data plane of a relatively small area. The small cell 12 may perform signaling interaction with the macro base station 11 by using the traditional cellular frequency band or the millimeter wave frequency band with a relatively low frequency, but cannot perform signaling interaction with the UE 13 by using the foregoing cellular frequency band or the millimeter wave frequency band with a relatively low frequency. In addition, the UE 13 in coverage of the small cell 12 generally performs data plane interaction with the small cell 12 by using a millimeter wave frequency band with a relatively high frequency, and performs control plane interaction with the macro base station 11 by using a cellular frequency band or a millimeter wave frequency band with a relatively low frequency. When the UE enters a coverage hole in a coverage area of the small cell, communication of the UE is disconnected. In this case, the UE needs to quickly re-establish a high-frequency link to maintain continuity of high-frequency communication.

In addition, in the high-low frequency macro/micro networking architecture, if there is only a small cell but no macro base station is deployed, the small cell may replace the macro base station to perform signaling interaction with the UE.

Figure 2:
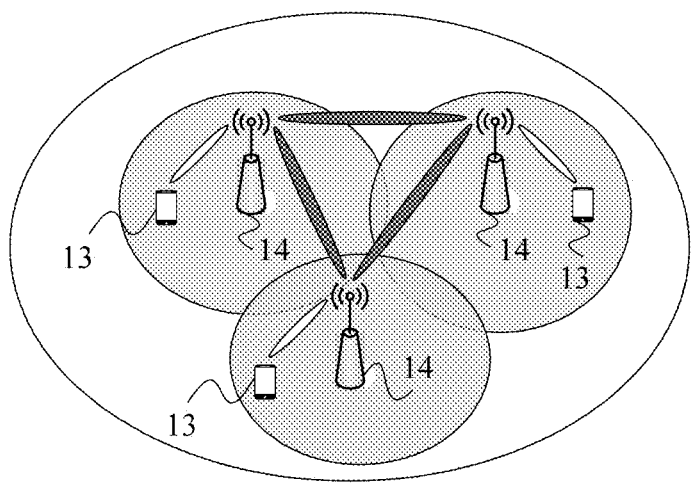
FIG. 2 is a diagram of a second application scenario of a method for implementing high-frequency communication in a coverage hole (that is, a high-low frequency distributed networking architecture) according to the present application.

FIG. 2 is a diagram of a second application scenario of a method for implementing high-frequency communication in a coverage hole (that is, a high-low frequency distributed networking architecture) according to the present application. As shown in FIG. 2, in the high-low frequency distributed networking architecture, a base station 14 and UE 13 are mainly included. The base station 14 may perform traditional low-speed cellular communication, for example, voice transmission, with the UE 13 by using a traditional cellular frequency band, for example, 2 GHz, or by using a millimeter wave frequency band with a relatively low frequency, where the millimeter wave frequency band with a relatively low frequency may be, for example, 3.5 GHz. In addition, the base station 14 may further perform high-rate communication, for example, video transmission, with the UE 13 by using a millimeter wave frequency band with a relatively high frequency, where the millimeter wave frequency band with a relatively high frequency may be, for example, 28 GHz, 38 GHz, or an E-Band. When the UE 13 enters a coverage hole in a coverage area of the base station 14, communication of the UE is disconnected. In this case, the UE needs to quickly re-establish a high-frequency link to maintain continuity of high-frequency communication.

It may be learned that regardless of a case in which high-frequency communication between UE and a small cell is performed in a high-low frequency macro/micro networking architecture or of a case in which high-frequency communication between UE and a base station is performed in a high-low frequency distributed networking architecture, how to quickly re-establish, after the UE enters a coverage hole, a high-frequency link to maintain communication continuity, thereby improving system reliability is a very important problem.

It should be noted that both of the application scenarios shown in FIG. 1 and FIG. 2 are Long Term Evolution (LTE) cellular network frameworks of the 3rd Generation Partnership Project (3GPP), but the present application is also applicable to another scenario in which a cellular network with wide coverage and millimeter wave cellular communication coexist.

Figure 3:
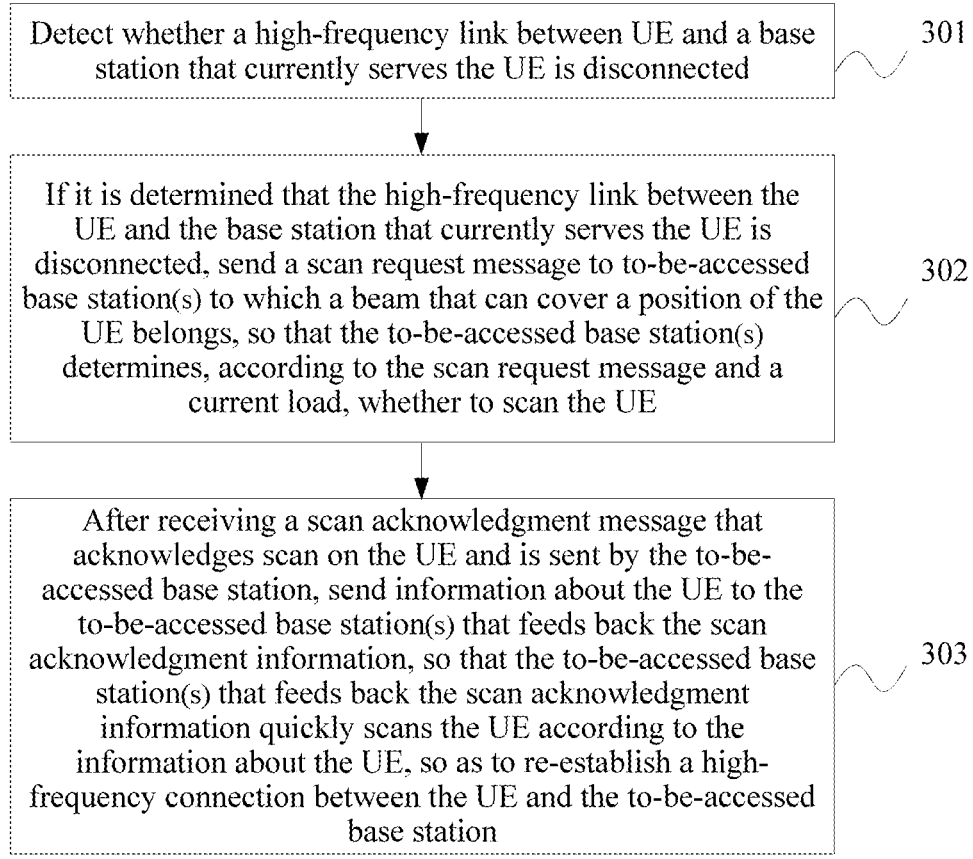
FIG. 3 is a flowchart of Embodiment 1 of a method for implementing high-frequency communication in a coverage hole according to the present application.

FIG. 3 is a flowchart of Embodiment 1 of a method for implementing high-frequency communication in a coverage hole according to the present application. This embodiment of the present application provides a method for implementing high-frequency communication in a coverage hole, where the method may be performed by any apparatus that performs the method for implementing high-frequency communication in a coverage hole, and the apparatus may be implemented by using software and/or hardware. In this embodiment, the apparatus may be integrated into a macro base station/a small cell/a base station.

Based on the foregoing system architecture shown in FIG. 1 or FIG. 2, as shown in FIG. 3, the method of this embodiment may include:

Step 301: Detect whether a high-frequency link between UE and a base station that currently serves the UE is disconnected.

In this embodiment, in a high-low frequency macro/micro networking architecture, if a macro base station is deployed, when the high-frequency link is suddenly disconnected or deteriorates into a state in which normal demodulation cannot be performed, that is, when the UE enters a coverage hole, the UE sends, by using a low frequency, a feedback message to the macro base station that is connected to the UE by using a low-frequency link, and sends an identifier of a coverage hole state to the macro base station to notify the macro base station that the UE is in the coverage hole and cannot perform normal high-frequency communication, and the macro base station that performs the low-frequency connection to the UE detects, according to the received feedback message, whether the high-frequency link between the UE and the base station that currently serves the UE is disconnected.

In the high-low frequency macro/micro networking architecture in which no macro base station is deployed, or in a high-low frequency distributed networking architecture, when the high-frequency link is suddenly disconnected or deteriorates into a state in which normal demodulation cannot be performed, a small cell/base station may learn that the UE enters a coverage hole, and detect whether the high-frequency link between the UE and the base station that currently serves the UE is disconnected.

Step 302: If it is determined that the high-frequency link between the UE and the base station that currently serves the UE is disconnected, send a scan request message to to-be-accessed base station(s) to which a beam that can cover a position of the UE belongs, so that the to-be-accessed base station(s) determines, according to the scan request message and a current load, whether to scan the UE.

In this embodiment, if the high-frequency link between the UE and the base station that currently serves the UE is disconnected, and when the UE learns, by means of querying, that all beams that cover the position of the UE cannot enable the UE to access a high-frequency link, that is, no alternative beam of the UE exists, or an alternative beam exists but switching fails, a scan request message is sent to to-be-accessed small cells/to-be-accessed base stations to which all beams that can cover the position of the UE belong. After receiving the scan request message, the to-be-accessed small cells/the to-be-accessed base stations determine, according to a current load of the to-be-accessed small cells/the to-be-accessed base stations, whether to quickly scan the UE. The to-be-accessed small cells/the to-be-accessed base stations determine, if the current load of the to-be-accessed small cells/the to-be-accessed base stations are relatively low, to scan the UE; or determine not to scan the UE if the current load of the to-be-accessed small cells/the to-be-accessed base stations are relatively large.

A method for obtaining all the beams that can cover the position of the UE may be: after measuring, the UE directly reports to the base station, and that the beams may be obtained by positioning the UE by the base station. For a specific obtaining manner, the present application imposes no specific limitation.

It should be noted that in the high-low frequency distributed networking architecture, the base station may further determine an approximate position of the UE by using a signal to noise ratio (SNR) according to stored positioning information of the UE or according to a direction of a beam that is projected to the UE, and after determining the position of the UE, may learn base stations whose beams can cover the UE, and then send the scan request message to to-be-accessed base stations to which all the beams that can cover the position of the UE belong.

Step 303: After receiving a scan acknowledgment message that acknowledges scan on the UE and is sent by the to-be-accessed base station(s), send information about the UE to the to-be-accessed base station(s) that feeds back the scan acknowledgment information, so that the to-be-accessed base station(s) that feeds back the scan acknowledgment information quickly scans or scan the UE according to the information about the UE, so as to re-establish a high-frequency connection between the UE and the to-be-accessed base station.

In this embodiment, if the current load of the to-be-accessed small cell(s)/the to-be-accessed base station(s) is or are relatively low, information for acknowledging scan on the UE is added to the scan acknowledgment message, and the scan acknowledgment message is sent to a macro base station/a small cell/a base station by using higher layer signaling, where the higher layer signaling may be, for example, radio resource control (RRC) signaling. The macro base station/the small cell/the base station sends, according to the scan acknowledgment message, the information about the UE to the to-be-accessed small cell(s)/the to-be-accessed base station(s) that determines to scan the UE.

The to-be-accessed small cell(s)/base station(s) that feeds back the scan acknowledgment information quickly scans the UE according to the information about the UE, allocates a specific time-frequency resource to the UE according to the current load, projects a beam to the position of the UE at the same time, and adjusts a direction of the beam that is projected to the position of the UE, so that the high-frequency connection is re-established between the UE and the to-be-accessed base station. The UE measures a related parameter of the beam, for example, the parameter may be a signal to noise and interference ratio (SINR), a signal to interference ratio (SIR), a channel capacity, or signal strength; selects, according to a measurement result, a beam with best signal quality from all beams that enable the UE to access the high-frequency link; and re-establishes the high-frequency connection to the to-be-accessed base station(s) by using the beam, which may reduce a disconnection probability of a high-frequency system.

According to the method for implementing high-frequency communication in a coverage hole provided in this embodiment of the present application, whether a high-frequency link between UE and a base station that currently serves the UE is disconnected is detected; if it is determined that the high-frequency link between the UE and the base station that currently serves the UE is disconnected, a scan request message is sent to to-be-accessed base station(s) to which a beam that can cover a position of the UE belongs, so that the to-be-accessed base station(s) determines or determine, according to the scan request message and a current load, whether to scan the UE; after a scan acknowledgment message that acknowledges scan on the UE and is sent by the to-be-accessed base station(s) is received, information about the UE is sent to the to-be-accessed base station(s) that feeds back the scan acknowledgment information, so that the to-be-accessed base station(s) that feeds back the scan acknowledgment information quickly scans or scan the UE according to the information about the UE, so as to re-establish a high-frequency connection between the UE and the to-be-accessed base station(s). When the UE enters a coverage hole and the high-frequency link between the UE and the base station that currently serves the UE is disconnected, all base stations that can cover the position of the UE are notified, and these base stations are instructed to determine, according to loads of the base stations, whether to scan the UE, so that the UE can quickly re-establish a high-frequency connection, thereby ensuring communication continuity and improving system reliability.

Optionally, the to-be-accessed base station includes the base station that currently serves the UE and another base station that can establish a high-frequency connection to the UE.

Specifically, in the high-low frequency macro/micro networking architecture in which a macro base station is deployed, the to-be-accessed base station includes the base station that currently serves the UE and another base station that can establish a high-frequency connection to the UE. Therefore, the macro base station that is connected to the UE by using a low-frequency link sends the scan request message to the base station that currently serves the UE and all base stations that can establish high-frequency connections to the UE.

Optionally, the to-be-accessed base station is at least one of other base stations, except the base station that currently serves the UE, that can establish a high-frequency connection to the UE.

Specifically, in the high-low frequency macro/micro networking architecture in which no macro base station is deployed, or in the high-low frequency distributed networking architecture, the to-be-accessed base station does not include the base station that currently serves the UE. Therefore, a small cell cell/base station that is originally connected to the UE by using a high-frequency link to the UE sends the scan request message to at least one base station that can establish a high-frequency connection to the UE.

Optionally, the information about the UE includes a UE identifier, a UE scanning period, UE positioning information, and a beam identifier.

Specifically, the UE identifier is used by the to-be-accessed small cell(s)/base station(s) to identify a UE to be scanned; the UE scanning period is used to match a UE scanning period when scanning is performed; the UE positioning information is used to determine the position of the UE, so that when scanning the UE, the to-be-accessed small cell(s)/base station(s) projects a beam to the UE according to the position of the UE; and the beam identifier is used to notify the to-be-accessed small cell(s)/base station(s) of a beam to be used to scan the UE.

According to the method for implementing high-frequency communication in a coverage hole provided in this embodiment of the present application, whether a high-frequency link between UE and a base station that currently serves the UE is disconnected is detected; if it is determined that the high-frequency link between the UE and the base station that currently serves the UE is disconnected, a scan request message is sent to to-be-accessed base station(s) to which a beam that can cover a position of the UE belongs, so that the to-be-accessed base station(s) determines, according to the scan request message and a current load, whether to scan the UE; after a scan acknowledgment message that acknowledges scan on the UE and is or are sent by the to-be-accessed base station(s) is received, information about the UE is sent to the to-be-accessed base station(s) that feeds back the scan acknowledgment information, so that the to-be-accessed base station(s) that feeds back the scan acknowledgment information quickly scans the UE according to the information about the UE, so as to re-establish a high-frequency connection between the UE and the to-be-accessed base station. When the UE enters a coverage hole and the high-frequency link between the UE and the base station that currently serves the UE is disconnected, all base stations that can cover the position of the UE are notified, and these base stations are instructed to determine, according to loads of the base stations, whether to scan the UE, so that the UE can quickly re-establish a high-frequency connection, thereby ensuring communication continuity and improving system reliability.

In a second implementation of the present application, as described in the foregoing method embodiment, optionally, after the high-frequency connection is re-established between the UE and the to-be-accessed base station, the method may further include:

after receiving a connection response message that carries a high-frequency connection status, sending a scan stop request message to another base station in the to-be-accessed base stations that feed back the scan acknowledgment information, except the base station that re-establishes the high-frequency connection to the UE.

Specifically, in the high-low frequency macro/micro networking architecture, if a macro base station is deployed, after the UE re-establishes the high-frequency connection to the to-be-accessed base station, the UE feeds back a high-frequency connection status to the macro base station that is connected to the UE by using a low-frequency link. After receiving a connection response message that carries the high-frequency connection status, the macro base station sends a scan stop request message to another small cell in all to-be-accessed small cells that determine to quickly scan the UE, except a second small cell that re-establishes a high-frequency connection to the UE, so that the another small cell stops scanning the UE, which saves a resource of the small cell.

If no macro base station is deployed in the high-low frequency macro/micro networking architecture, or in the high-low frequency distributed networking architecture, after the to-be-accessed small cell/the to-be-accessed base station re-establishes a high-frequency connection to the UE, in this case, the to-be-accessed small cell/the to-be-accessed base station that re-establishes the high-frequency connection to the UE feeds back a high-frequency connection status to an originally connected small cell/base station. After receiving a connection response message that carries the high-frequency connection status, the originally connected small cell/base station stops quickly scanning the UE, and sends a scan stop request message at the same time to another small cell/base station in all to-be-accessed small cells/to-be-accessed base stations that determine to quickly scan the UE, except the small cell/the base station that re-establishes the high-frequency connection to the UE, so as to stop scanning the UE, which saves a resource of the small cell/the base station.

In a third implementation of the present application, as described in the foregoing method embodiment, optionally, the method may further include:

detecting, at intervals of a preset period, all beams that can cover the position of the UE, and sending beam information to the UE, so that the UE measures the beams according to the beam information, and obtains a measurement result, where the beam information includes a beam identifier, a cell identifier, and an array identifier; and receiving the measurement result sent by the UE, and determining an alternative beam according to the measurement result, where the alternative beam is a beam that enables a high-frequency connection to be established between the UE and the to-be-accessed base station.

Specifically, after the UE accesses a macro base station by using a low frequency, the macro base station may position, in a manner such as a GPS, all beams that can cover the UE, and send related information of the beams to the UE at the same time in a low-frequency manner, where the related information of the beams includes a beam identifier, a cell identifier, an array identifier, and the like. After receiving the related information of the beams, the UE measures a related parameter of the beam according to the related information, where the related parameter of the beam may be, for example, a SINR, a SIR, a channel capacity, or signal strength. When the UE learns, by means of determining according to a measurement result, that all values of the related parameters of the beam are greater than preset thresholds, it means that the beam may enable a high-frequency connection to be established between the UE and the to-be-accessed base station. The UE selects, according to the measurement result, a beam with best signal quality to access a high-frequency link, uses, as an alternative beam, another beam that enables a high-frequency connection to be established between the UE and the to-be-accessed base station, and feeds back, by using a low frequency, information about the alternative beams to a small cell/base station originally connected to the UE.

In addition, in the high-low frequency macro/micro networking architecture in which no macro base station is deployed, the UE may periodically measure the beam to periodically update the alternative beam. A period value may be separately set by a macro base station that is connected to the UE by using a low-frequency link, and then each UE that performs access is notified by using a low frequency, or may be uniformly set by a macro base station that is connected to the UE by using a low-frequency link, and then all UEs are notified by using broadcast signaling. For a selection of a specific value of a period and a period configuration manner, this embodiment imposes no specific limitation.

In a fourth implementation of the present application, as described in the foregoing method embodiment, optionally, the method may further include:

obtaining a current position of the UE at intervals of a preset period, and using the current position as a position of the UE.

Specifically, in the high-low frequency macro/micro networking architecture in which a macro base station is deployed, because a low-frequency connection between the UE and the macro base station is not disconnected, the macro base station originally connected to the UE may periodically measure a current position of the UE, where the current position of the UE obtained after measurement is used a position of the UE. It may be learned that as the current position of the UE changes, the beam covering the position of the UE also changes, that is, the to-be-accessed small cell is periodically updated. In this way, a probability at which a small cell successfully re-establishes a high-frequency link to the UE may be increased.

It should be noted that in the high-low frequency macro/micro networking architecture in which no macro base station is deployed, or in the high-low frequency macro/micro networking architecture, because a connection between a small cell/base station originally connected to the UE and the UE is disconnected, the small cell/base station originally connected to the UE cannot periodically update the current position of the UE.

According to the method for implementing high-frequency communication in a coverage hole provided in this embodiment of the present application, whether a high-frequency link between UE and a base station that currently serves the UE is disconnected is detected; if it is determined that the high-frequency link between the UE and the base station that currently serves the UE is disconnected, a scan request message is sent to to-be-accessed base station(s) to which a beam that can cover a position of the UE belongs, so that the to-be-accessed base station(s) determines or determine, according to the scan request message and a current load, whether to scan the UE; after a scan acknowledgment message that acknowledges scan on the UE and is or are sent by the to-be-accessed base station(s) is received, information about the UE is sent to the to-be-accessed base station(s) that feeds back the scan acknowledgment information, so that the to-be-accessed base station(s) that feeds back the scan acknowledgment information quickly scans the UE according to the information about the UE, so as to re-establish a high-frequency connection between the UE and the to-be-accessed base station. When the UE enters a coverage hole and the high-frequency link between the UE and the base station that currently serves the UE is disconnected, all base stations that can cover the position of the UE are notified, and these base stations are instructed to determine, according to loads of the base stations, whether to scan the UE, so that the UE can quickly re-establish a high-frequency connection, thereby ensuring communication continuity and improving system reliability. In addition, an alternative beam is periodically updated, which increases a probability at which the base station successfully re-establishes a high-frequency link to the UE, and reduces a disconnection probability of a high-frequency system.

Figure 4:
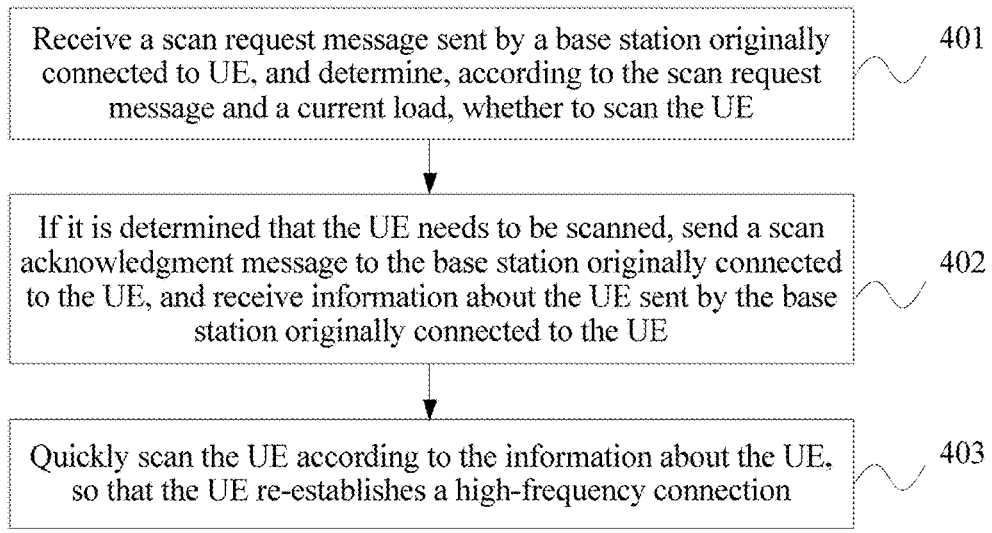
FIG. 4 is a flowchart of Embodiment 5 of a method for implementing high-frequency communication in a coverage hole according to the present application.

FIG. 4 is a flowchart of Embodiment 5 of a method for implementing high-frequency communication in a coverage hole according to the present application. This embodiment of the present application provides a method for implementing high-frequency communication in a coverage hole, where the method may be performed by any apparatus that performs the method for implementing high-frequency communication in a coverage hole, and the apparatus may be implemented by using software and/or hardware. In this embodiment, the apparatus may be integrated into the foregoing small cell/base station that re-establishes a high-frequency connection to the UE.

Based on the foregoing system architecture shown in FIG. 1 or FIG. 2, as shown in FIG. 4, the method of this embodiment may include:

Step 401: Receive a scan request message sent by a base station originally connected to UE, and determine, according to the scan request message and a current load, whether to scan the UE.

In this embodiment, after the UE enters a coverage hole, a small cell/base station originally connected to the UE detects whether a high-frequency link between the UE and a base station that currently serves the UE is disconnected, and if it is determined that the high-frequency link between the UE and the base station that currently serves the UE is disconnected, and when the UE learns, by means of querying, that all beams that cover a position of the UE cannot enable the UE to establish a high-frequency connection to a small cell/a base station, that is, no alternative beam of the UE exists, or an alternative beam exists but switching fails, the small cell/base station originally connected to the UE sends a scan request message to to-be-accessed small cells/to-be-accessed base stations to which all beams that cover the position of the UE belong. After receiving the scan request message sent by the small cell/base station originally connected to the UE, the to-be-accessed small cell/the to-be-accessed base station determines current load of the to-be-accessed small cell/the to-be-accessed base station, and determines whether to scan the UE; if the current load is relatively low, determines to scan the UE; or if the current load is relatively large, determines not to scan the UE.

Step 402: If it is determined that the UE needs to be scanned, send a scan acknowledgment message to the base station originally connected to the UE, and receive information about the UE sent by the base station originally connected to the UE.

In this embodiment, if it is determined that the UE in the coverage hole needs to be scanned, the to-be-accessed small cell/the to-be-accessed base station adds a message for acknowledging scan to the scan acknowledgment information and sends the scan acknowledgment information to a macro base station/a small cell/a base station. After receiving the scan acknowledgment information, the macro base station/small cell/base station sends the information about the UE to the to-be-accessed base station that feeds back the scan acknowledgment information.

Step 403: Quickly scan the UE according to the information about the UE, so that the UE re-establishes a high-frequency connection.

In this embodiment, after receiving scan information, the to-be-accessed small cell/base station that feeds back the scan acknowledgment information quickly scans the UE according to the information about the UE, allocates a specific time-frequency resource to the UE according to the current load, and at the same time, adjusts a direction of a beam that is projected to the UE, so that the UE can re-establish the high-frequency connection to the to-be-accessed small cell/base station. The UE measures a related parameter of the beam, for example, the parameter may be a SINR, a SIR, a channel capacity, or signal strength, selects, according to a measurement result, a beam with best quality from all beams that enable the UE to re-establish a high-frequency connection to the to-be-accessed small cell/base station, and re-establishes the high-frequency connection to the to-be-accessed small cell/the to-be-accessed base station by using the beam.

According to the method for implementing high-frequency communication in a coverage hole provided in this embodiment of the present application, a scan request message sent by a base station originally connected to UE is received, and whether to scan the UE is determined according to the scan request message and a current load; if it is determined that the UE needs to be scanned, a scan acknowledgment message is sent to the base station originally connected to the UE, and information about the UE sent by the base station originally connected to the UE is received; the UE is quickly scanned according to the information about the UE, so that the UE re-establishes a high-frequency connection. Because the scan request message sent by the base station originally connected to the UE is received so that the UE in a coverage hole is quickly scanned, an objective of re-establishing a high-frequency connection to the UE is achieved, and system reliability is improved.

In Embodiment 6 of the present application, as described in the foregoing method embodiment, optionally, before the quickly scanning the UE according to the information about the UE, the method may further include:

allocating a time-frequency resource to the UE according to the current load; and the quickly scanning the UE according to the information about the UE specifically includes:

determining a position of the UE according to the information about the UE; and projecting a beam to the position of the UE according to the time-frequency resource and the position of the UE, so that the UE pairs an uplink beam and a downlink beam and locks the beams, and the UE re-establishes the high-frequency connection.

Specifically, after receiving scan information sent by the base station originally connected to the UE, a to-be-accessed small cell/a to-be-accessed base station allocates a specific time-frequency resource to the UE according to the current load of the to-be-accessed small cell/the to-be-accessed base station. In addition, optionally, the to-be-accessed small cell/the to-be-accessed base station may dynamically adjust, according to the current load, the time-frequency resource allocated to the UE, which improves resource utilization of an entire network, and improves a system network capacity. After allocating the specific time-frequency resource to the UE, the to-be-accessed small cell/the to-be-accessed base station determines the position of the UE according to the information about the UE, and projects the beam to the position of the UE according to the time-frequency resource allocated to the UE and the determined position of the UE. The UE pairs an uplink beam sent by the UE and a downlink beam sent by the base station, and if pairing succeeds, locks the beams, and a high-frequency connection is re-established between the UE and the to-be-accessed small cell/the to-be-accessed base station by using the locked beams.

In Embodiment 7 of the present application, as described in the foregoing method embodiment, optionally, the method may further include:

sending, to the base station originally connected to the UE, a connection response message that carries a high-frequency link connection status, so that the base station originally connected to the UE stops quickly scanning the UE according to the connection response message, and sends a scan stop request message to another base station in to-be-accessed base stations that send the scan acknowledgment messages, except a base station that re-establishes a high-frequency connection to the UE.

Specifically, in a high-low frequency macro/micro networking architecture, if no macro base station is deployed, or in a high-low frequency distributed networking architecture, a small cell/a base station that re-establishes a high-frequency connection to the UE sends, to a small cell/base station originally connected to the UE, a connection response message that carries a high-frequency link connection status, so that the small cell/base station originally connected to the UE stops quickly scanning the UE according to the connection response message, and at the same time, sends a scan stop request message to another small cell/base station in all to-be-accessed small cells/base stations that determine to quickly scan the UE, except the small cell/base station that re-establishes the high-frequency connection to the UE, so that the another small cell stops scanning the UE, which saves a resource of the small cell.

Optionally, the information about the UE includes a UE identifier, a UE scanning period, UE positioning information, and a beam identifier.

Specifically, the UE identifier is used by the to-be-accessed small cell/base station to identify a UE to be scanned; the UE scanning period is used to match a UE scanning period when scanning is performed; the UE positioning information is used to enable the to-be-accessed small cell/base station to project a beam to the UE when scanning the UE; and the beam identifier is used to notify the to-be-accessed small cell/base station of a beam to be used to scan the UE.

According to the method for implementing high-frequency communication in a coverage hole provided in this embodiment of the present application, a scan request message sent by a base station originally connected to UE is received, and whether to scan the UE is determined according to the scan request message and a current load; if it is determined that the UE needs to be scanned, a scan acknowledgment message is sent to the base station originally connected to the UE, and information about the UE sent by the base station originally connected to the UE is received; the UE is quickly scanned according to the information about the UE, so that the UE re-establishes a high-frequency connection. Because the scan request message sent by the base station originally connected to the UE is received so that the UE in a coverage hole is quickly scanned, an objective of re-establishing a high-frequency connection to the UE is achieved, and system reliability is improved. In addition, after re-establishing the high-frequency connection to the UE, the base station originally connected to the UE instructs another base station, except the base station that re-establishes the high-frequency connection to the UE, to stop scanning the UE, which saves a resource of the base station.

Figure 5:
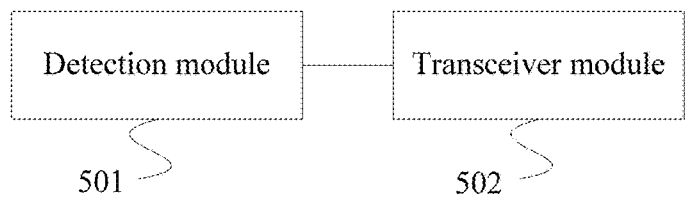
FIG. 5 is a structural diagram of Embodiment 1 of a apparatus for implementing high-frequency communication in a coverage hole according to the present application.

FIG. 5 is a structural diagram of Embodiment 1 of a apparatus for implementing high-frequency communication in a coverage hole according to the present application. As shown in FIG. 5, the apparatus for implementing high-frequency communication in a coverage hole provided in this embodiment of the present application includes a detection module 501 and a transceiver module 502.

The detection module 501 is configured to detect whether a high-frequency link between UE and a base station that currently serves the UE is disconnected. The transceiver module 502 is configured to: if it is determined that the high-frequency link between the UE and the base station that currently serves the UE is disconnected, send a scan request message to to-be-accessed base station(s) to which a beam that can cover a position of the UE belongs, so that the to-be-accessed base station(s) determines or determine, according to the scan request message and a current load, whether to scan the UE. The transceiver module 502 is further configured to: after receiving a scan acknowledgment message that acknowledges scan on the UE and is sent by the to-be-accessed base station(s), send information about the UE to the to-be-accessed base station(s) that feeds back the scan acknowledgment information, so that the to-be-accessed base station(s) that feeds back the scan acknowledgment information quickly scans the UE according to the information about the UE, so as to re-establish a high-frequency connection between the UE and the to-be-accessed base station.

According to the apparatus for implementing high-frequency communication in a coverage hole provided in this embodiment of the present application, whether a high-frequency link between UE and a base station that currently serves the UE is disconnected is detected; if it is determined that the high-frequency link between the UE and the base station that currently serves the UE is disconnected, a scan request message is sent to to-be-accessed base station(s) to which a beam that can cover a position of the UE belongs, so that the to-be-accessed base station(s) determines or determine, according to the scan request message and a current load, whether to scan the UE; after a scan acknowledgment message that acknowledges scan on the UE and is sent by the to-be-accessed base station(s) is received, information about the UE is sent to the to-be-accessed base station(s) that feeds back the scan acknowledgment information, so that the to-be-accessed base station(s) that feeds back the scan acknowledgment information quickly scans the UE according to the information about the UE, so as to re-establish a high-frequency connection between the UE and the to-be-accessed base station. When the UE enters a coverage hole and the high-frequency link between the UE and the base station that currently serves the UE is disconnected, all base stations that can cover the position of the UE are notified, and these base stations are instructed to determine, according to loads of the base stations, whether to scan the UE, so that the UE can quickly re-establish a high-frequency connection, thereby ensuring communication continuity and improving system reliability.

Optionally, the to-be-accessed base station includes the base station that currently serves the UE and another base station that can establish a high-frequency connection to the UE.

Optionally, the to-be-accessed base station is at least one of other base stations, except the base station that currently serves the UE, that can establish a high-frequency connection to the UE.

Optionally, the information about the UE includes a UE identifier, a UE scanning period, UE positioning information, and a beam identifier.

Optionally, the transceiver module 502 is further configured to: after receiving a connection response message that carries a high-frequency connection status, send a scan stop request message to another base station in the to-be-accessed base stations that feed back the scan acknowledgment information, except the base station that re-establishes the high-frequency connection to the UE.

Figure 6:
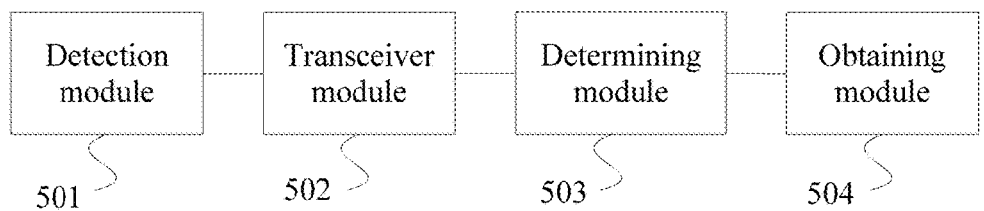
FIG. 6 is a structural diagram of Embodiment 2 of a apparatus for implementing high-frequency communication in a coverage hole according to the present application.

FIG. 6 is a structural diagram of Embodiment 2 of a apparatus for implementing high-frequency communication in a coverage hole according to the present application. As shown in FIG. 6, this embodiment is based on the embodiment shown in FIG. 5, and the apparatus further includes a determining module 503.

The detection module 501 is further configured to detect, at intervals of a preset period, all beams that can cover the position of the UE. The transceiver module 502 is further configured to send beam information to the UE, so that the UE measures the beams according to the beam information, and obtains a measurement result, where the beam information includes a beam identifier, a cell identifier, and an array identifier. The transceiver module 502 is further configured to receive the measurement result sent by the UE. The determining module 503 is configured to determine an alternative beam according to the measurement result, where the alternative beam is a beam that enables a high-frequency connection to be established between the UE and the to-be-accessed base station.

Optionally, the apparatus further includes an obtaining module 504, where the obtaining module 504 is configured to obtain a current position of the UE at intervals of a preset period, and use the current position as a position of the UE.

The apparatus for implementing high-frequency communication in a coverage hole in this embodiment may be configured to perform a technical solution of the method for implementing high-frequency communication in a coverage hole provided in any embodiment of the present application. Implementation principles and technical effects of the apparatus are similar, and details are not described herein.

Figure 7:
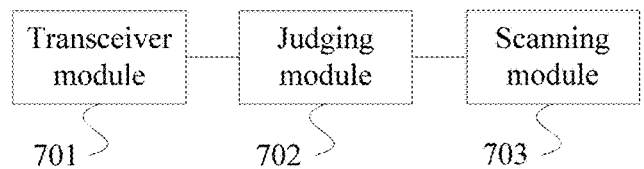
FIG. 7 is a structural diagram of Embodiment 3 of a apparatus for implementing high-frequency communication in a coverage hole according to the present application.

FIG. 7 is a structural diagram of Embodiment 3 of a apparatus for implementing high-frequency communication in a coverage hole according to the present application. As shown in FIG. 7, the apparatus for implementing high-frequency communication in a coverage hole provided in this embodiment of the present application includes a transceiver module 701, a judging module 702, and a scanning module 703.

The transceiver module 701 is configured to receive a scan request message sent by a base station originally connected to user equipment UE. The judging module 702 is configured to determine, according to the scan request message and a current load, whether the UE is to be scanned. The transceiver module 701 is further configured to: if the judging module determines that the UE needs to be scanned, send a scan acknowledgment message to the base station originally connected to the UE, and receive information about the UE sent by the base station originally connected to the UE. The scanning module 703 is configured to quickly scan the UE according to the information about the UE, so that the UE re-establishes a high-frequency connection.

According to the apparatus for implementing high-frequency communication in a coverage hole provided in this embodiment of the present application, a scan request message sent by a base station originally connected to UE is received, and whether to scan the UE is determined according to the scan request message and a current load; if it is determined that the UE needs to be scanned, a scan acknowledgment message is sent to the base station originally connected to the UE, and information about the UE sent by the base station originally connected to the UE is received; the UE is quickly scanned according to the information about the UE, so that the UE re-establishes a high-frequency connection. Because the scan request message sent by the base station originally connected to the UE is received so that the UE in a coverage hole is quickly scanned, an objective of re-establishing a high-frequency connection to the UE is achieved, and system reliability is improved.

Figure 8:
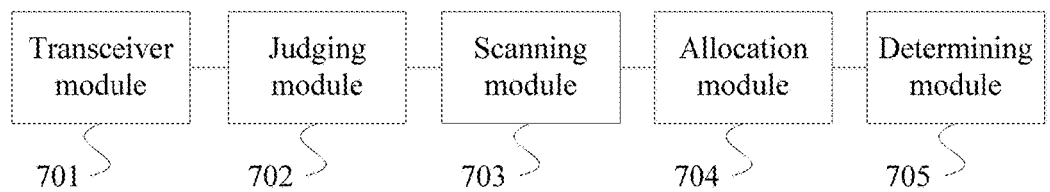
FIG. 8 is a structural diagram of Embodiment 4 of a apparatus for implementing high-frequency communication in a coverage hole according to the present application.

FIG. 8 is a structural diagram of Embodiment 4 of a apparatus for implementing high-frequency communication in a coverage hole according to the present application. As shown in FIG. 8, this embodiment is based on the embodiment shown in FIG. 7, and the apparatus further includes an allocation module 704 and a determining module 705.

The allocation module 704 is configured to allocate a time-frequency resource to the UE according to the current load.

The determining module 705 is specifically configured to determine a position of the UE according to the information about the UE.

The scanning module 703 is specifically configured to project a beam to the position of the UE according to the time-frequency resource and the position of the UE, so that the UE pairs an uplink beam and a downlink beam and locks the beams, and the UE re-establishes the high-frequency connection.

Optionally, the transceiver module 701 is further configured to: send, to the base station originally connected to the UE, a connection response message that carries a high-frequency link connection status, so that the base station originally connected to the UE stops quickly scanning the UE according to the connection response message, and sends a scan stop request message to another base station in to-be-accessed base stations that send the scan acknowledgment messages, except a base station that re-establishes a high-frequency connection to the UE.

The apparatus for implementing high-frequency communication in a coverage hole in this embodiment may be configured to perform a technical solution of the method for implementing high-frequency communication in a coverage hole provided in any embodiment of the present application. Implementation principles and technical effects of the apparatus are similar, and details are not described herein.

Figure 9:
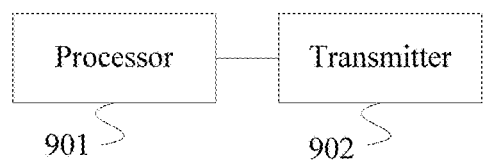
FIG. 9 is a structural diagram of Embodiment 1 of a base station according to the present application.

FIG. 9 is a structural diagram of Embodiment 1 of a base station according to the present application. As shown in FIG. 9, the base station provided in this embodiment of the present application includes a processor 901 and a transmitter 902.

The processor 901 is configured to detect whether a high-frequency link between the UE and a base station that currently serves the UE is disconnected. The transmitter 902 is configured to: when the processor determines that the high-frequency link between the UE and the base station that currently serves the UE is disconnected, send a scan request message to to-be-accessed base station(s) to which a beam that can cover a position of the UE belongs, so that the to-be-accessed base station(s) determines or determine, according to the scan request message and a current load, whether to scan the UE. The transmitter 902 is further configured to: after the receiver receives a scan acknowledgment message that acknowledges scan on the UE and is sent by the to-be-accessed base station(s), send information about the UE to the to-be-accessed base station(s) that feeds back the scan acknowledgment information, so that the to-be-accessed base station(s) that feeds back the scan acknowledgment information quickly scans the UE according to the information about the UE, so as to re-establish a high-frequency connection between the UE and the to-be-accessed base station.

The base station provided in this embodiment may be configured to perform a technical solution of the method for implementing high-frequency communication in a coverage hole provided in any embodiment of the present application. Implementation principles and technical effects of the base station are similar, and details are not described herein.

Optionally, the to-be-accessed base station includes the base station that currently serves the UE and another base station that can establish a high-frequency connection to the UE.

Optionally, the to-be-accessed base station is at least one of other base stations, except the base station that currently serves the UE, that can establish a high-frequency connection to the UE.

Optionally, the information about the UE includes a UE identifier, a UE scanning period, UE positioning information, and a beam identifier.

Optionally, the transmitter 902 is further configured to: after the receiver receives a connection response message that carries a high-frequency connection status, send a scan stop request message to another base station in the to-be-accessed base stations that feed back the scan acknowledgment information, except the base station that re-establishes the high-frequency connection to the UE.

Figure 10:
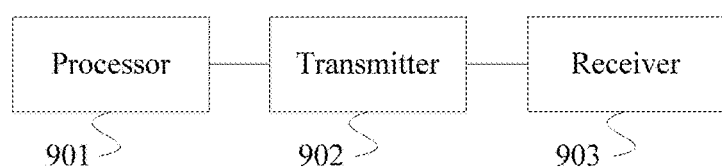
FIG. 10 is a structural diagram of Embodiment 2 of a base station according to the present application.

FIG. 10 is a structural diagram of Embodiment 2 of a base station according to the present application. As shown in FIG. 10, this embodiment is based on the embodiment shown in FIG. 9, and the base station further includes a receiver 903.

The processor 901 is further configured to detect, at intervals of a preset period, all beams that can cover the position of the UE. The transmitter 902 is further configured to send beam information to the UE, so that the UE measures the beams according to the beam information, and obtains a measurement result, where the beam information includes a beam identifier, a cell identifier, and an array identifier. The receiver 903 is configured to receive the measurement result sent by the UE. The processor 901 is further configured to determine an alternative beam according to the measurement result, where the alternative beam is a beam that enables a high-frequency connection to be established between the UE and the to-be-accessed base station.

Optionally, the processor 901 is further configured to obtain a current position of the UE at intervals of a preset period, and use the current position as a position of the UE.

The base station provided in this embodiment may be configured to perform a technical solution of the method for implementing high-frequency communication in a coverage hole provided in any embodiment of the present application. Implementation principles and technical effects of the base station are similar, and details are not described herein.

Figure 11:
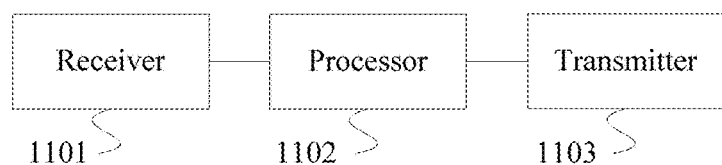
FIG. 11 is a structural diagram of Embodiment 1 of a base station according to the present application.

FIG. 11 is a structural diagram of Embodiment 1 of a base station according to the present application. As shown in FIG. 11, the base station provided in this embodiment of the present application includes a receiver 1101, a processor 1102, and a transmitter 1103.

The receiver 1101 is configured to receive a scan request message sent by a base station originally connected to user equipment UE. The processor 1102 is configured to determine, according to the scan request message and a current load, whether to scan the UE. The transmitter 1103 is configured to: if the processor determines that the UE needs to be scanned, send a scan acknowledgment message to the base station originally connected to the UE. The receiver 1101 is further configured to receive information about the UE sent by the base station originally connected to the UE. The processor 1102 is further configured to quickly scan the UE according to the information about the UE, so that the UE re-establishes a high-frequency connection.

The base station provided in this embodiment may be configured to perform a technical solution of the method for implementing high-frequency communication in a coverage hole provided in any embodiment of the present application. Implementation principles and technical effects of the base station are similar, and details are not described herein.

Optionally, the processor 1102 is further configured to allocate a time-frequency resource to the UE according to the current load; and the processor 1102 is further configured to: determine a position of the UE according to the information about the UE, and project a beam to the position of the UE according to the time-frequency resource and the position of the UE, so that the UE pairs an uplink beam and a downlink beam and locks the beams, and the UE re-establishes the high-frequency connection.

Optionally, the transmitter 1103 is further configured to: send, to the base station originally connected to the UE, a connection response message that carries a high-frequency link connection status, so that the base station originally connected to the UE stops quickly scanning the UE according to the connection response message, and sends a scan stop request message to another base station in to-be-accessed base stations that send the scan acknowledgment messages, except a base station that re-establishes a high-frequency connection to the UE.

Optionally, the information about the UE includes a UE identifier, a UE scanning period, UE positioning information, and a beam identifier.

Figure 12:
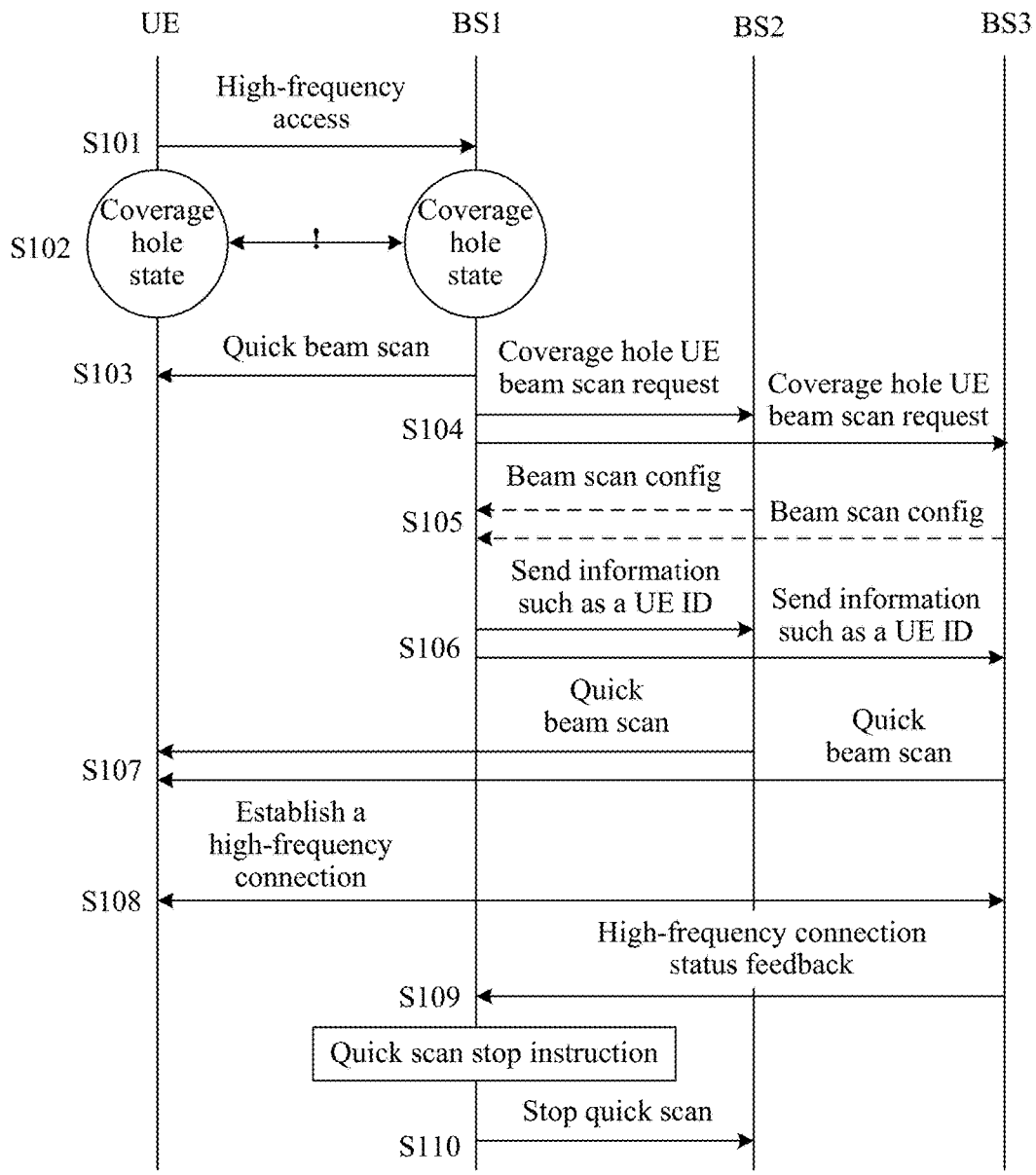
FIG. 12 is a signaling flowchart of a method for implementing high-frequency communication in a coverage hole according to Embodiment 8 of the present application.

Referring to FIG. 12, Embodiment 8 of the present application further provides a method for implementing high-frequency communication in a coverage hole, and the method includes the following steps:

S101: UE selects, according to a measurement result, a high-frequency beam of a base station (for example, a BS1) to perform access.

S102: When the base station detects that high-frequency uplink signal quality of the UE deteriorates to a specific threshold, or when high-frequency channel quality fed back by the UE deteriorates to a specific threshold, or when the base station does not receive feedback from the UE within a specific preset time, or when a bit error rate that the base station receives high-frequency uplink data of the UE increases to a specific threshold, or when a high-frequency link of the UE is suddenly disconnected or deteriorates into a state in which normal demodulation cannot be performed, and there is no switchable alternative beam or switching fails, it is determined that the UE enters a coverage hole.

S103: The originally connected base station (for example, the BS1) determines an approximate position of the UE, projects a beam to an area of the UE in the coverage hole, and quickly scans the UE. The determining a position of the UE in the coverage hole may be: determining the position according to stored UE positioning information, or determining the position by using an SNR according to a direction of the beam projected to the UE.

S104: The originally connected base station determines the position of the UE, may know specific high-frequency beams of specific base stations that can cover the UE, and sends a request for quickly scanning the UE in the coverage hole to target base stations (for example, a BS2 and a BS3) to which high-frequency beams that can cover the area of the UE belong. A method for determining the target base station is not limited to a method for determining the target base station according to the position of the UE.

S105: After receiving the quick scan request, another base station determines whether to perform the quick scan, and performs, by using higher layer signaling (for example, RRC signaling), feedback to the base station to which the UE is connected, or may not perform feedback. The determining whether to perform quick scan may be: determining, according to a current load of the base station, whether to perform quick scan. For example, if the current load of the base station is relatively high, quick scan is not performed; or if the current load of the base station is relatively low, it is determined that quick scan needs to be performed, which is not limited to a method according to the load.

S106: The originally connected base station sends information about the UE in the coverage hole (a UE ID, a UE scanning period, UE positioning information, a small cell scanning beam ID, and the like) to a base station that accepts the quick scan request.

S107: The base station that accepts the quick scan request quickly scans the UE in the coverage hole, allocates a specific time-frequency resource, and projects a beam to the area of the UE in the coverage hole according to the UE positioning information.

S108: A UE end selects an RX beam and a received TX beam to perform pairing and locking, so as to re-establish a high-frequency connection.

S109: A base station that establishes a high-frequency connection to the UE sends, to the originally connected base station, feedback of a UE high-frequency connection status.

S110: The originally connected base station stops quick scan and sends a quick scan stop instruction to the base station that is quickly scanning the UE in the coverage hole.

Figure 13:
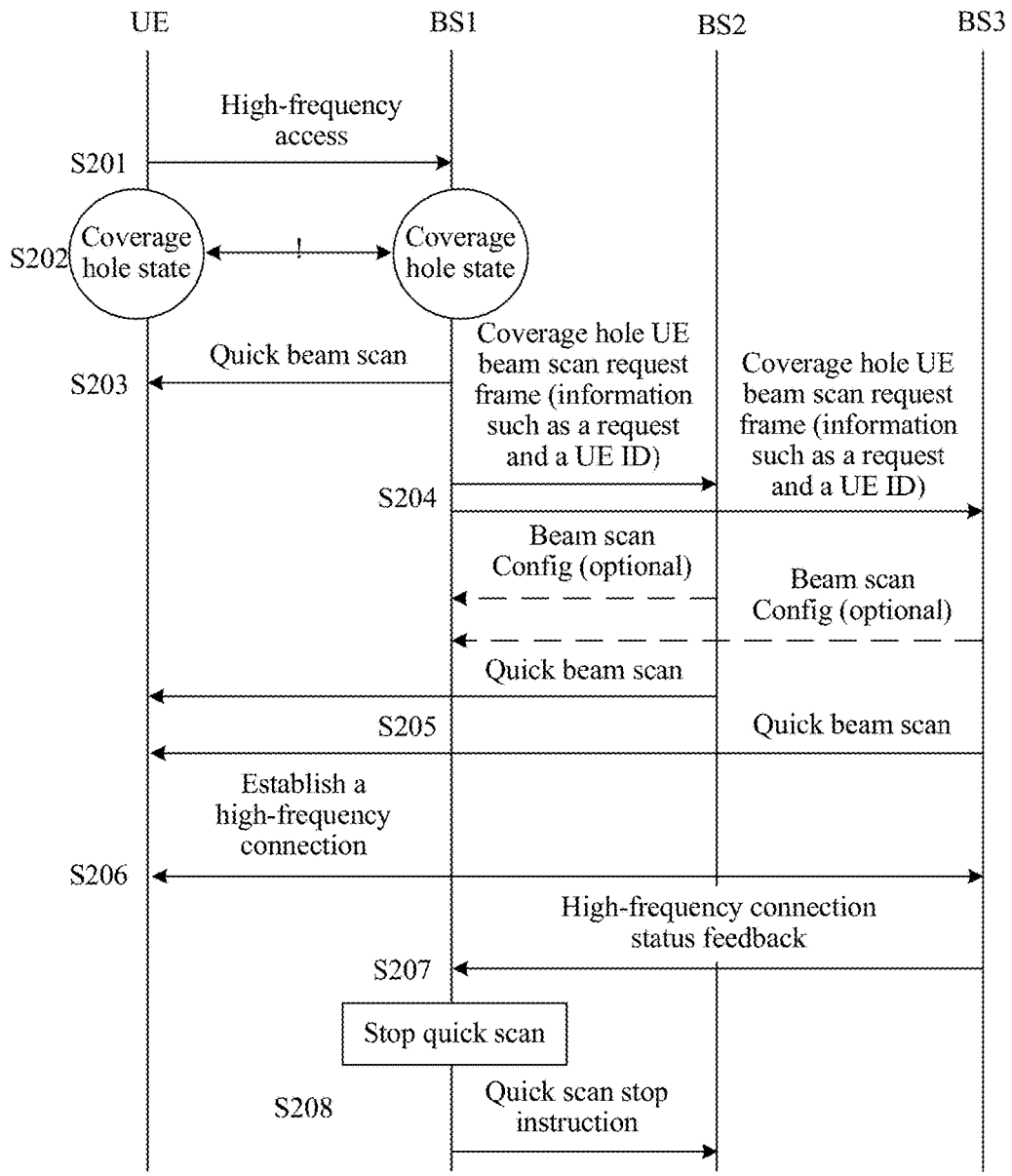
FIG. 13 is a signaling flowchart of a method for implementing high-frequency communication in a coverage hole according to Embodiment 9 of the present application.

Referring to FIG. 13, Embodiment 9 of the present application further provides a method for implementing high-frequency communication in a coverage hole, and the method includes the following steps:

S201: UE selects, according to a measurement result, a high-frequency beam of a base station BS1 to perform access.

S202: When the base station BS1 detects that high-frequency uplink signal quality of the UE deteriorates to a specific threshold, or when high-frequency channel quality fed back by the UE deteriorates to a specific threshold, or when the base station does not receive feedback from the UE within a specific preset time, or when a bit error rate that the base station receives high-frequency uplink data of the UE increases to a specific threshold, or when a high-frequency link of the UE is suddenly disconnected or deteriorates into a state in which normal demodulation cannot be performed, and there is no switchable alternative beam or switching fails, it is determined that the UE enters a coverage hole.

S203: The base station BS1 determines an approximate position of the UE, projects a beam to an area of the UE in the coverage hole, and quickly scans the UE. The determining a position of the UE in the coverage hole may be: determining the position according to stored UE positioning information, or determining the position by using an SNR according to a direction of the beam projected to the UE.

S204: The base station BS1 may know, according to the position of the UE, specific high-frequency beams of specific base stations that can cover the UE, and sends a quick scan request frame to target base stations (for example, base stations BS2 and BS3) to which high-frequency beams that can cover the area of the UE belong, where the request frame includes a request for scanning the UE in the coverage hole and information about the UE in the coverage hole (a UE ID, a UE scanning period, UE positioning information, a small cell scanning beam ID, and the like). A method for determining the target base station is not limited to a method for determining the target base station according to the position of the UE.

S205: The base station that receives the quick scan request determines whether to perform the quick scan, if it is determined that scan needs to be performed, quickly scans the UE according to the received information about the UE in the coverage hole, allocates a specific time-frequency resource, projects a beam to the area of the UE in the coverage hole according to the UE positioning information; the base station that receives the quick scan request may feed back or may not feed back, to an originally connected base station, a result of whether the base station performs quick scan. That the base station that receives the quick scan request determines whether to perform quick scan may be: determining, according to a current load of the base station, whether to perform quick scan. For example, if the current load of the base station is relatively high, quick scan is not performed; or if the current load of the base station is relatively low, it is determined that quick scan needs to be performed, which is not limited to a method according to the load.

S206: A UE end selects an RX beam and a received TX beam to perform beam pairing and locking, so as to re-establish a high-frequency connection.

S207: A base station that establishes a high-frequency connection to the UE sends, to the originally connected base station, feedback of a UE high-frequency connection status.

S208: The originally connected base station stops quick scan and sends a quick scan stop instruction to the base station that is quickly scanning the UE in the coverage hole.

The foregoing embodiments of the present application may be mutually combined or separately exist, so as to perform the foregoing communication method or to implement a function of the foregoing communication device (for example, an originally connected base station or a target to-be-accessed base station).

Figure 14:
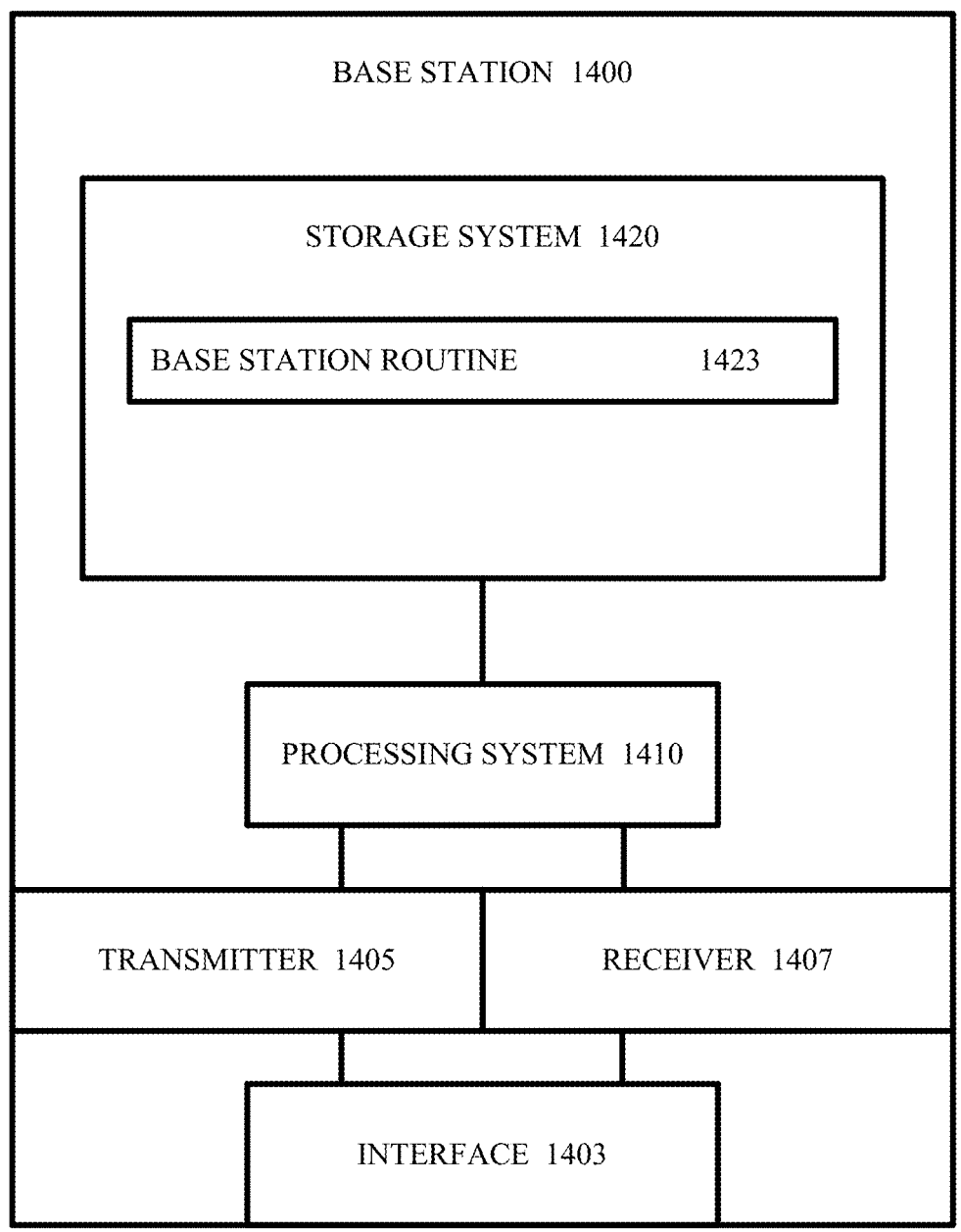
FIG. 14 illustrates a base station according to any of the disclosed embodiments.

FIG. 14 illustrates a base station 1400 according to any of the disclosed embodiments. The base station 1400 comprises a processing system 1410 coupled to a transmitter 1405, a receiver 1407, an interface 1405, and a storage system 1420. The storage system 1420 stores software including a base station routine 1423. In addition, the storage system 1420 may store data, including data to be used by the base station routine 1423. Some conventional aspects of the base station 1400 are omitted for clarity, such as power supplies, enclosures, and the like.

The processing system 1410 can comprise circuit boards, integrated circuitry, and associated electronics. The processing system 1410 can comprise one or more processors, including multi-core processors. The storage system 1420 comprises non-transitory, machine-readable data storage media, such as flash drives, disc drives, memory circuitry, servers, or the like. The base station routine 1423 comprises machine-readable instructions that control the operation of the processing system 1410 when executed by the processing system 1410. The base station routine 1423 implements high-frequency communications. The storage system 1420 may store additional data or software, such as operating systems, applications, utilities, databases, and the like. All or portions of the base station routine 1423 may be internally stored. Alternatively, some or all of the base station routine 1423 may be externally stored on one or more storage media, such as flash drives, discs, servers, and the like.

The interface 1403 is directly or indirectly coupled to the processing system 1410. The interface 1403 comprises a communication interface, including one or more communication ports, signal processing circuitry, memory, software, and the like. The interface 1403 in some embodiments comprises a network interface exchanging communications with a network or networks, including wireless networks, wired networks, or optical networks. The interface 1403 in some embodiments includes wireless communication equipment, including antennas or an antenna interface. The interface 1403 in other embodiment s includes wired communication equipment, including a wire or network interface. The interface 1403 in some embodiments additionally comprises a user interface, including one or more user input devices and/or one or more user output devices.

The transmitter 1405 is coupled to the processing system 1410 and to the interface 1403 in the example shown. The transmitter 1405 receives data from the processing system 1410, generates high-frequency communications, and transmits the high-frequency communications. The transmitter 1405 can directly transmit the high-frequency communications, or can transmit the high-frequency communications via the interface 1403.

The receiver 1407 is coupled to the processing system 1410 and to the interface 1403 in the example shown. The receiver 1407 receives high-frequency communications and processes (or pre-processes) the high-frequency communications, passing the resulting communications and/or data to the processing system 1410. The receiver 1407 can directly receive the high-frequency communications, or can receive the high-frequency communications via the interface 1403.

When executed by the processing system 1410, in some embodiments the base station routine 1423 causes the base station 1400 to send a scan request message to at least one target to-be-accessed base station to which a beam that can cover a position of user equipment (UE) belongs, receive acknowledgement scan information sent by the at least one target to-be-accessed base station, send information about the UE to the at least one target to-be-accessed base, so that the at least one target to-be-accessed base station scans the UE according to the information about the UE, and establish a high-frequency connection between the UE and one base station of the at least one of target to-be-accessed base station.

When executed by the processing system 1410, in some embodiments the base station routine 1423 causes the base station 1400 to receive a scan request message sent by a base station originally connected to user equipment (UE), send a scan acknowledgment message to the base station originally connected to the UE, receive information about the UE sent by the base station originally connected to the UE, and scan the UE according to the information about the UE, establishing a high-frequency connection between the UE and the high-frequency base station.

It should be understood that any of the embodiments shown in FIGS. 5-11 can be implemented by the base station 1400.

The base station provided in this embodiment may be configured to perform a technical solution of the method for implementing high-frequency communication in a coverage hole provided in any embodiment of the present application. Implementation principles and technical effects of the base station are similar, and details are not described herein.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A method for implementing high-frequency communication, comprising:
    sending, by an originally connected base station, a scan request message to at least one target to-be-accessed base station when user equipment (UE) served by the originally connected base station is in a coverage hole state;
    receiving, by the originally connected base station, acknowledgement scan information sent by the at least one target to-be-accessed base station;
    sending, by the originally connected base station, information about the UE to the at least one target to-be-accessed base station, so that the at least one target to-be-accessed base station scans the UE according to the information about the UE, and establishes a high-frequency connection between the UE and one of the at least one target to-be-accessed base station;

detecting, at intervals of a preset period, all beams that can cover a position of the UE;

sending beam information to the UE comprising one or more of a beam identifier, a cell identifier, and an array identifier;

receiving a measurement result of all beams sent by the UE; and determining an alternative beam according to the measurement result, wherein the alternative beam is a beam that enables a high-frequency connection to be established between the UE and one of the at least one target to-be-accessed base station.

2. The method according to claim 1, wherein the at least one target to-be-accessed base station refers to a base station to which a beam that covers a position of the UE belongs.

3. The method according to claim 1, wherein the coverage hole state comprises at least one of:

a received uplink signal quality of the UE is less than a preset signal quality threshold, a channel quality fed back by the UE is less than a channel quality threshold, that no feedback from the UE is received within a preset time, that a bit error rate of receiving data of the UE reaches a preset bit error rate threshold, or that a received data signal quality of the UE deteriorates into a state in which demodulation cannot be performed.

4. The method according to claim 1, wherein the information about the UE comprises one or more of a UE identifier, a UE scanning period, UE positioning information, or a beam identifier.

5. The method according to claim 1, further comprising:

after the high-frequency connection is established between one of the at least one target to-be-accessed base station and the UE, receiving a feedback message that carries a UE high-frequency connection status, and sending a scan stop message to another base station in the target to-be-accessed base stations, except the base station that establishes the high-frequency connection to the UE.

6. The method according to claim 1, further comprising:

obtaining a current position of the UE at intervals of a preset period and using the current position as a position of the UE.

7. A method for implementing high-frequency communication, comprising:

receiving, by a high-frequency base station, a scan request message sent by a base station originally connected to user equipment (UE);

sending, by the high-frequency base station, a scan acknowledgment message to the base station originally connected to the UE;

sending, by the originally connected base station, information about the UE to the at least one target to-be-accessed base station, so that the at least one target to-be-accessed base station scans the UE according to the information about the UE, and establishes a high-frequency connection between the UE and one of the at least one target to-be-accessed base station;

receiving, by the high-frequency base station, information about the UE sent by the base station originally connected to the UE;

allocating, by the high-frequency base station, a time-frequency resource to the UE according to a current load of the high-frequency base station;

determining, by the high-frequency base station, a position of the UE according to the information about the UE;

receiving a measurement result of all beams sent by the UE; and projecting, by the high-frequency base station, a beam to the position of the UE according to the time-frequency resource and the position of the UE, so that the UE pairs an uplink beam and a downlink beam and establishes a high-frequency connection between the high-frequency base station and the UE.

8. The method according to claim 7, further comprising:

sending, by the high-frequency base station, to the base station originally connected to the UE, a connection response message that carries a high-frequency link connection status.

9. The method according to claim 7, wherein the information about the UE comprises one or more of a UE identifier, a UE scanning period, UE positioning information, or a beam identifier.

10. A base station, comprising:

a transmitter configured to send a scan request message to at least one target to-be-accessed base station to which a beam that can cover a position of user equipment (UE) belongs; and a receiver configured to receive acknowledgement scan information sent by the at least one target to-be-accessed base station;

the transmitter is further configured to:

send information about the UE to the at least one target to-be-accessed base, so that the at least one target to-be-accessed base station scans the UE according to the information about the UE;

establish a high-frequency connection between the UE and one base station of the at least one of target to-be-accessed base station;

the processor is further configured to detect, at intervals of a preset period, all beams that cover the position of the UE;

the transmitter is further configured to send beam information to the UE, so that the UE measures the beams according to the beam information, wherein the beam information comprises a beam identifier, a cell identifier, and an array identifier;

the receiver is configured to receive a measurement result of all beams sent by the UE; and the processor is further configured to determine an alternative beam according to the measurement result, wherein the alternative beam is a beam that enables a high-frequency connection to be established between the UE and the one base station of the at least one target to-be-accessed base station.

11. The base station according to claim 10, wherein the at least one target to-be-accessed base station refers to a base station to which a beam that covers a position of the UE belongs.

12. The base station according to claim 10, wherein the information about the UE comprises one or more of a UE identifier, a UE scanning period, UE positioning information, or a beam identifier.

13. The base station according to claim 10, wherein:

the transmitter is further configured to, after the receiver receives a connection response message that carries a high-frequency connection status, send a scan stop request message to another base station in the at least one target to-be-accessed base station, except the base station that establishes the high-frequency connection to the UE.

14. The base station according to claim 11, wherein:
the processor is further configured to obtain a current position of the UE at intervals of a preset period, and use the current position as a position of the UE.

15. A high-frequency base station, comprising:
a receiver configured to receive a scan request message sent by a base station originally connected to user equipment (UE); and
a transmitter configured to send a scan acknowledgment message to the base station originally connected to the UE; wherein
the receiver is further configured to receive information about the UE sent by the base station originally connected to the UE;
a processor coupled to the receiver and the transmitter and configured to scan the UE according to the information about the UE, establishing a high-frequency connection between the UE and the high-frequency base station;
allocate a time-frequency resource to the UE according to a current load;
determine a position of the UE according to the information about the UE; and
receiving a measurement result of all beams sent by the UE; and
project a beam to the position of the UE according to the time-frequency resource and the position of the UE, so that the UE pairs an uplink beam and a downlink beam and.

16. The base station according to claim 15, wherein the transmitter is further configured to:
send, to the base station originally connected to the UE, a connection response message that carries a high-frequency link connection status.

17. The method according to claim 15, wherein the information about the UE comprises one or more of a UE identifier, a UE scanning period, UE positioning information, or a beam identifier.

* * * * *